No. 712,226. Patented Oct. 28, 1902.
H. H. WING.
PROCESS OF OBTAINING ALUM.
(Application filed Sept. 20, 1901.)
(No Model.)
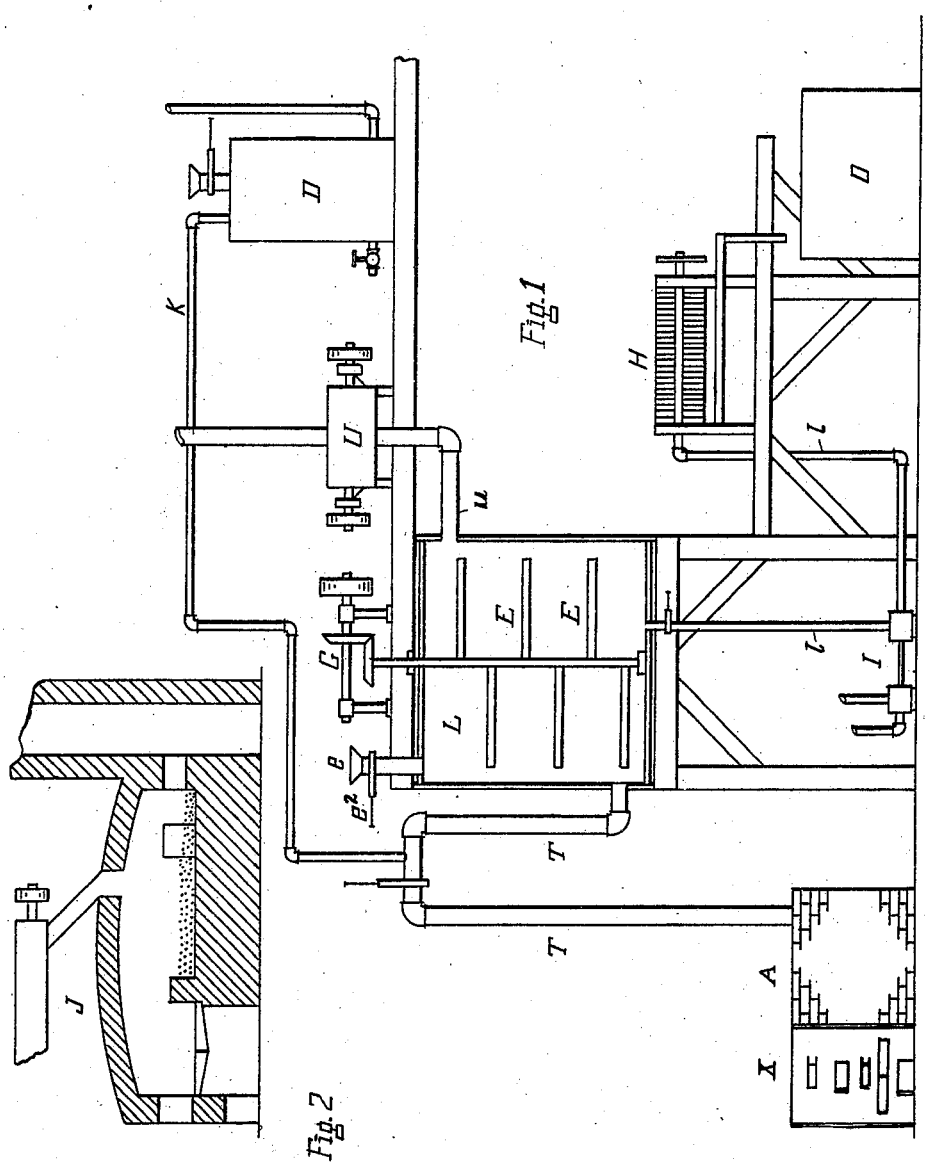
WITNESSES:
INVENTOR Herbert H. Wing.
his ATTORNEY

UNITED STATES PATENT OFFICE.

HERBERT H. WING, OF NEW BRIGHTON, NEW YORK.

PROCESS OF OBTAINING ALUM.

SPECIFICATION forming part of Letters Patent No. 712,226, dated October 28, 1902.

Application filed September 20, 1901. Serial No. 75,732. (No specimens.)

*To all whom it may concern:*

Be it known that I, HERBERT H. WING, a citizen of the United States, residing at New Brighton, in the county of Richmond and State of New York, have invented certain new and useful Improvements in Processes of Obtaining Alum; and I do hereby declare the following to be a full, clear, and exact description of the invention, such as will enable others skilled in the art to which it appertains to make and use the same.

The object of my invention is to utilize sulfur fumes in the obtaining of chemical products in the place of other and more expensive chemicals which have hitherto always been used in the commercial production of such chemical products and also to use sulfur fumes which are too dilute to use in the usual processes for the manufacture of sulfuric acid, &c. By my process I am also able to use sulfur fumes which are contaminated with air or with air and carbonic-acid gas or with sulfuric-acid gas. Besides being able to use sulfur fumes which are a waste product and often a great nuisance, so that in many cases they have to be got rid of at great expense, the chemicals which I produce by the aid of such fumes are at present produced by expensive chemicals, among which sulfuric acid forms a large item of the cost of the materials used. The dilute sulfur fumes are by my process converted into dilute sulfuric acid under such conditions that the oxidizing agent can be converted into an insoluble compound, and by so doing a further quantity of sulfuric acid is produced. The insoluble compound can then be separated from the acid liquor and regenerated to be used over again, and by repeating these operations an indefinite amount of sulfur fumes can be converted into sulfuric acid by the use of a definite and moderate quantity of oxidizing reagents.

The reagent which I use in the first step of my invention to generate the first portion of sulfuric acid from the sulfur fumes is preferably the sulfate of copper.

In general terms, my process consists in first passing sulfur fumes containing sulfur dioxid and air with more or less of $SO_3$ through a heated solution of copper sulfate, which is maintained at such temperature preferably by use of hot sulfur fumes, but may be otherwise heated, if preferred. The result of the continued passage of such fumes is the production of dilute sulfuric acid in the coppersulfate solution. While the sulfur fumes are thus passing through the copper-sulfate solution I preferably introduce into this solution aluminium hydrate, either in the form of bauxite or refined aluminium oxid or hydrate. By so doing the sulfuric acid generated from the sulfur fumes is neutralized as soon as produced, thereby utilizing any advantage that may be gained by the action of nascent sulfuric acid. Besides this the copper sulfate is more active with reference to the $SO_2$ when only a small amount of sulfuric acid is present. Time is also saved, as the alumina requires a certain amount of time to be converted into sulfate, and the two reactions can in this way go on simultaneously. When sufficient alumina has been converted into sulfate in a given quantity of liquid, the passage of the sulfur fumes is discontinued or preferably directed into a second absorbing-tank. The solution of the sulfates of aluminium and copper is then allowed to stand, and the insoluble impurities are settled or filtered out. I then pass sulfureted-hydrogen gas through the solution, whereby the copper is precipitated as copper sulfid and sulfuric acid is generated, while the aluminium sulfate is unacted upon. The copper sulfid is then separated from the sulfate-of-aluminium solution, preferably by means of a filter-press. The copper sulfid is then heated in a furnace or calciner, whereby it is converted into oxid and more or less sulfate. The sulfur fumes and more or less air from this operation can be mixed with air from this operation can be utilized to convert the oxid thus produced into sulfate by passing them through a tank containing the oxid suspended in water, forming first a sulfite and then the oxygen of the fumes oxidizing it to sulfate. The solution of aluminium sulfate which is separated in the filter-press from the copper sulfid will contain the equivalent amount of sulfuric acid, according to the equation—

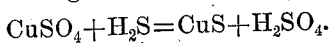
$$CuSO_4 + H_2S = CuS + H_2SO_4.$$

The sulfuric acid is then neutralized with alumina or aluminium hydrate, thereby producing a further amount of sulfate of aluminium and at the same time concentrating the solution.

The copper sulfate can also be separated from the aluminium-sulfate solution by another method—viz., by electrolyzing the double sulfate solution, producing copper at the cathode and liberating sulfuric acid at the anode. As it is injurious and also increases the cost of depositing the copper to allow the acid in the bath to accumulate, it is preferable to withdraw continuously a portion of the bath and neutralize the sulfuric acid therein with alumina or aluminium hydrate and then electrolyze these neutralized solutions until no further deposit of copper can be obtained. The copper can be used to regenerate the copper-sulfate solution by granulating it and bringing sulfur fumes in water in contact with it, or fresh quantities of roasted copper ores or mattes can be used to produce the copper-sulfate solution. The solution of aluminium sulfate which remains in each case after the separation of the copper sulfate can then be concentrated and finally poured out onto a floor to solidify, as is ordinarily done to make the alum cake or "concentrated alum," as it is commercially called. Instead of making the simple sulfate of aluminium from the dilute solution thus obtained it will require less evaporation to make a potash alum by adding to the solution of sulfate of aluminium the required amount of sulfate of potassium to produce the compound $AlK(SO_4)_2 12H_2O$, which is then concentrated and allowed to crystallize in tanks.

To carry out my process of utilizing sulfur fumes as above described, a variety of different forms of apparatus may be used. In the annexed drawings I have shown a form of apparatus which is adapted for such work.

Figure 1 represents in elevation and partial section the apparatus for producing the aluminium sulfate. Fig. 2 represents in sectional elevation a common reverberatory furnace, in which the copper sulfid may be converted into sulfate.

In the drawings, X represents a source from which fumes containing sulfur dioxid may be obtained and may be a smelting-furnace, ore-roaster, or any apparatus from which fumes containing sulfur dioxid can be obtained.

A represents a dust-collecting chamber for settling out any dust carried by the fumes.

T T represent pipes which convey the fumes to the absorbing apparatus L, which consists of a tank provided with means, as E E, for agitating the contents and mechanism G for operating the agitators E E.

$e$ is a hopper with a valve $e^2$.

H represents a filter-press which is connected with the absorber L by the pipe $l$. The pump I is used to force the contents of the tank L through the filter-press H.

O represents a tank for crystallizing out the alum.

D is a tank for producing sulfureted-hydrogen gas, and K is the outlet-pipe for conducting the $H_2S$ gas into the absorber L.

J is a furnace or calciner used to convert the copper sulfid into oxid and sulfate, the sulfur fumes from the same leading into an absorber similar to L, in which the mixed oxid and sulfate are converted into a copper-sulfate solution.

The method of operating the apparatus shown in the drawings consists in first passing the sulfur fumes containing $SO_2$ with some air and more or less $SO_3$ from the source X through the dust-settling chamber A, then through the pipes T T and the absorbing apparatus L, through which they are drawn by means of the suction maintained by the suction-blower U, which is connected to the upper part of the absorber L by the pipe $u$. The absorbing apparatus L is nearly filled with a solution of copper sulfate, to which is added a quantity of aluminium hydrate, either in the form of powdered bauxite or refined alumina or aluminium hydrate. The reaction between the copper sulfate and the sulfur fumes proceeds better when the solution is heated, and this can be accomplished by using hot sulfur fumes, which will soon heat up the solution, or the heat can be increased by use of a steam-jacket or steam-coils within the tank. By continuing to pass the sulfur fumes through the absorber they are converted into dilute sulfuric acid, which as soon as liberated acts on the suspended aluminium hydrate, producing the sulfate of aluminium. The solution of the copper sulfate is thereby rendered most active, as the accumulation of free sulfuric acid retards the reaction. From time to time more of the aluminium compound is added to the absorber until any desired strength of aluminium-sulfate solution is obtained. The sulfur gases are then directed into a second absorber. The solution is now filtered or the insoluble impurities settled out, if there are any, and the solution is pumped back into the absorber L. I then pass sulfureted-hydrogen gas, generated in any usual way in tank D, through the solution, keeping it agitated continuously until all the copper is precipitated as the sulfid, sulfuric acid being produced at the same time, while the aluminium-sulfate solution is unacted upon. The contents of absorber L are then pumped into the filter-press H, where the copper-sulfid precipitate is held and the sulfate-of-aluminium solution passes through. The copper sulfid is then removed from filter-press and heated in the furnace J, where if the temperature is slowly raised a considerable amount of the sulfid is oxidized directly into sulfate, while the balance is obtained as oxid, and the sulfur fumes from the same are drawn through another absorber, like L, in which the mixed oxid and sulfate are added to the water, so that after a sufficient length of time the oxid is converted into sulfite and then oxidized to sulfate, thus obtaining a regenerated copper-sulfate solution in which to make another quantity of sulfate of aluminium. The sulfate-of-aluminium solution passing through the filter-press H is forced into the tank K, where I add a further quantity of the aluminium compound to neutralize the sulfuric acid which was generated by the precipitation of the copper sulfid by the sulfureted hydrogen. This increases the strength of the aluminium-sulfate solution. The sulfuric acid generated by the combination of the sulfureted hydrogen and the copper sulfate can be neutralized before the copper sulfid is filtered by the addition of the alumina or aluminium hydrate or afterward, as above described, the only difference being in the relative convenience of the two methods. Instead of using sulfureted-hydrogen gas for the separation of the copper-sulfate solution from the aluminium-sulfate solution as it is produced in the absorber L, I can electrolyze the double sulfate solution, thus obtaining the pure copper at the cathode and liberating sulfuric acid at the anode. As it is injurious to the copper and increases the cost of depositing the copper when too acid a bath is used, I preferably withdraw continuously a portion of the bath and neutralize the sulfuric acid with alumina or aluminium hydrate and then continue the electrolysis of these neutralized solutions until no further deposit of copper can be obtained. The copper may then be sold as electrolytic copper, or it can be granulated and used by treating it with sulfur fumes in an absorber, like L, or by previously oxidizing it and then treating it with sulfur fumes in an absorber, like L, whereby a copper-sulfate solution can be regenerated in which to make another quantity of sulfate of aluminium. When the electrolytic copper is sold as such, roasted copper ore or matte can be used to make up the copper-sulfate solution, thus effecting the electrolytic refining of the matte and obtaining the alum product in one process. The solution of aluminium sulfate, which is obtained in either case free from any other products, is now concentrated by evaporating the water therefrom until such a concentration is obtained that the sulfate when poured out on a stone floor will become in a short time a hard mass, as is the usual practice. The alum cake or "concentrated alum," as it is called, is then broken up or ground and barreled ready for shipment.

Instead of making the simple sulfate of aluminium from the dilute solution it will require less evaporation to make a potash alum, which is easily done by adding anhydrous sulfate of potash to the sulfate of aluminium in solution in the proper proportion to form the compound $AlK(SO_4)_2 12H_2O$, which is then concentrated and allowed to crystallize in tanks.

As the sulfate of aluminium is used at present where the double sulfate of potassium and aluminium could be used to a very large extent, the amount of the former manufactured being several times as large as the latter, the term "alum" has come to be applied in the trade to the sulfate of aluminium, so that the word "alum" has come to mean either the sulfate of aluminium or the double sulfate of aluminium and potassium. As both varieties may be produced by my process, I have used the word "alum" as a generic term embracing both the single and double sulfate, as above described.

What I claim as my invention is—

1. The herein-described process of obtaining alum which consists in bringing sulfur fumes containing sulfur dioxid and air into contact with a solution containing sulfate of copper, thereby liberating sulfuric acid; neutralizing the sulfuric acid thus set free by the oxid or hydrate of aluminium, whereby the sulfate of aluminium is produced; then breaking up the copper compound by separating the copper therefrom and leaving the sulfuric acid with which it was combined in the solution; then neutralizing said acid by adding the oxid or hydrate of aluminium, thereby obtaining a solution containing substantially sulfate of aluminium only.

2. The herein-described process of obtaining alum which consists in bringing sulfur fumes containing sulfur dioxid and air into contact with a solution containing sulfate of copper and holding the oxid or hydrate of aluminium in suspension, whereby the sulfur dioxid in said fumes is converted into sulfuric acid and sulfate of aluminium is produced; then breaking up the copper compound by separating the copper therefrom and leaving the sulfuric acid with which it was combined in the solution; then neutralizing said acid by adding the oxid or hydrate of aluminium, thereby obtaining a solution containing substantially sulfate of aluminium only; then crystallizing out the alum from said solution.

3. The herein-described process of obtaining aluminium sulfate and a by-product which consists in bringing sulfur fumes containing sulfur dioxid and air into contact with a solution containing sulfate of copper and holding the oxid or hydrate of aluminium in suspension, whereby the sulfur dioxid in said fumes is converted into sulfuric acid and sulfate of aluminium is produced; then bringing sulfureted hydrogen into contact with said solution, whereby copper sulfid and sulfuric acid are produced; then separating the insoluble copper sulfid from the liquor containing the aluminium sulfate and free sulfuric acid; then neutralizing said acid with the oxid or hydrate of aluminium; whereby a solution containing substantially sulfate of aluminium is obtained.

4. The herein-described process of obtaining aluminium sulfate and a by-product which consists in bringing sulfur fumes containing sulfur dioxid and air into contact with a solution containing sulfate of copper and holding the oxid or hydrate of aluminium in suspension, whereby the sulfur dioxid in said fumes is converted into sulfuric acid and sulfate of aluminium is produced; then bringing sulfureted hydrogen into contact with said solution whereby copper sulfid and sulfuric acid are produced; then separating the insoluble copper sulfid from the liquor containing the aluminium sulfate and free sulfuric acid; then neutralizing said acid with the oxid or hydrate of aluminium; whereby a solution containing substantially sulfate of aluminium is obtained; then concentrating said solution, whereby crystallized aluminium sulfate is obtained on cooling the solution.

5. The herein-described process of obtaining aluminium sulfate and a by-product which consists in bringing sulfur fumes containing sulfur dioxid and air into contact with a solution containing sulfate of copper and holding the hydrate or oxid of aluminium in suspension, whereby the sulfur dioxid in said fumes is converted into sulfuric acid and sulfate of aluminium is produced; then bringing sulfureted hydrogen into contact with said solution, whereby copper sulfid and sulfuric acid are produced; then neutralizing said acid with the oxid or hydrate of aluminium; then separating the insoluble copper sulfid from the liquor, whereby a solution containing the aluminium sulfate is obtained.

6. The herein-described process of obtaining aluminium sulfate and a by-product which consists in bringing sulfur fumes containing sulfur dioxid and air into contact with a solution containing sulfate of copper and holding the hydrate or oxid of aluminium in suspension, whereby the sulfur dioxid in said fumes is converted into sulfuric acid and sulfate of aluminium is produced; then bringing sulfureted hydrogen into contact with said solution, whereby copper sulfid and sulfuric acid are produced; then neutralizing said acid with the oxid or hydrate of aluminium; then separating the insoluble copper sulfid from the liquor, whereby a solution containing the aluminium sulfate is obtained; then concentrating said solution, whereby crystallized aluminium sulfate is obtained on cooling the solution.

7. The herein-described process of obtaining alum and a by-product which consists in bringing sulfur fumes containing sulfur dioxid and air into contact with a solution containing sulfate of copper and holding the oxid or hydrate of aluminium in suspension whereby the sulfur dioxid in said fumes is converted into sulfuric acid and sulfate of aluminium is produced; then bringing sulfureted hydrogen into contact with said solution, whereby copper sulfid and sulfuric acid are produced; then separating the insoluble copper sulfid from the liquor containing the aluminium sulfate and free sulfuric acid; then neutralizing said acid with the oxid or hydrate of aluminium, whereby a solution containing substantially only the sulfate of aluminium is obtained; then adding sufficient sulfate of potassium to said solution whereby the double sulfate of potassium and aluminium is obtained.

8. The herein-described process of obtaining alum and a by-product which consists in bringing sulfur fumes containing sulfur dioxid and air into contact with a solution containing sulfate of copper and holding the oxid or hydrate of aluminium in suspension whereby the sulfur dioxid in said fumes is converted into sulfuric acid and sulfate of aluminium is produced; then bringing sulfureted hydrogen into contact with said solution, whereby copper sulfid and sulfuric acid are produced; then separating the insoluble copper sulfid from the liquor containing the aluminium sulfate and free sulfuric acid; then neutralizing said acid with the oxid or hydrate of aluminium, whereby a solution containing substantially only the sulfate of aluminium is obtained; then adding sufficient sulfate of potassium to said solution whereby the double sulfate of potassium and aluminium is obtained; then crystallizing out said alum from said solution.

9. The herein-described process of obtaining alum and a by-product which consists in bringing sulfur fumes containing sulfur dioxid and air into contact with a solution containing sulfate of copper and holding the oxid or hydrate of aluminium in suspension, whereby the sulfur dioxid in said fumes is converted into sulfuric acid and sulfate of aluminium is produced; then bringing sulfureted hydrogen into contact with said solution, whereby copper sulfid and sulfuric acid are produced; then neutralizing said acid with the oxid or hydrate of aluminium; then separating the insoluble copper sulfid from the liquor containing the aluminium sulfate; then adding sufficient sulfate of potassium to said solution whereby the double sulfate of potassium and aluminium is obtained.

10. The herein-described process of obtaining alum and a by-product which consists in bringing sulfur fumes containing sulfur dioxid and air into contact with a solution containing sulfate of copper and holding the oxid or hydrate of aluminium in suspension, whereby the sulfur dioxid in said fumes is converted into sulfuric acid and sulfate of aluminium is produced; then bringing sulfureted hydrogen into contact with said solution, whereby copper sulfid and sulfuric acid are produced; then neutralizing said acid with the oxid or hydrate of aluminium; then separating the insoluble copper sulfid from the liquor containing the aluminium sulfate; then adding sufficient sulfate of potassium to said solution whereby the double sulfate of potassium and aluminium is obtained; and then crystallizing out said alum from said solution.

In testimony whereof I hereto affix my signature in presence of two witnesses.

HERBERT H. WING.

Witnesses:
GEO. H. GIBSON,
ARTHUR MERWIN ROSS.